United States Patent
Gonion et al.

(10) Patent No.: US 7,620,797 B2
(45) Date of Patent: *Nov. 17, 2009

(54) INSTRUCTIONS FOR EFFICIENTLY ACCESSING UNALIGNED VECTORS

(75) Inventors: Jeffry E. Gonion, Sunnyvale, CA (US); Keith E. Diefendorff, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 99 days.

This patent is subject to a terminal disclaimer.

(21) Appl. No.: 11/591,804

(22) Filed: Nov. 1, 2006

(65) Prior Publication Data

US 2008/0114968 A1    May 15, 2008

(51) Int. Cl.
*G06F 9/30* (2006.01)
*G06F 9/00* (2006.01)

(52) U.S. Cl. .................. 712/204; 712/223; 712/225; 712/226; 712/5

(58) Field of Classification Search ............. 712/4, 712/220, 204, 225, 226, 300, 5, 223
See application file for complete search history.

(56) References Cited

U.S. PATENT DOCUMENTS

| | | | | |
|---|---|---|---|---|
| 4,435,792 A * | 3/1984 | Bechtolsheim | ......... | 365/189.02 |
| 4,823,286 A * | 4/1989 | Lumelsky et al. | ........... | 345/611 |
| 4,903,217 A * | 2/1990 | Gupta et al. | ................ | 345/545 |
| 5,450,605 A * | 9/1995 | Grochowski et al. | .......... | 712/23 |
| 5,630,083 A * | 5/1997 | Carbine et al. | .............. | 712/212 |
| 5,751,981 A * | 5/1998 | Witt et al. | .................... | 712/204 |
| 5,758,116 A * | 5/1998 | Lee et al. | ..................... | 712/210 |
| 6,049,860 A * | 4/2000 | Krygowski et al. | ........... | 712/25 |
| 6,336,178 B1 * | 1/2002 | Favor | .......................... | 712/23 |
| 6,453,278 B1 * | 9/2002 | Favor et al. | ................... | 703/27 |
| 6,496,923 B1 * | 12/2002 | Gruner et al. | ............... | 712/213 |
| 7,051,168 B2 * | 5/2006 | Gschwind et al. | ........... | 711/154 |
| 7,219,212 B1 * | 5/2007 | Sanghavi et al. | ............... | 712/6 |
| 7,301,369 B2 * | 11/2007 | Kanno et al. | .................. | 326/41 |
| 7,302,552 B2 * | 11/2007 | Guffens et al. | .............. | 712/204 |

(Continued)

*Primary Examiner*—Eddie P Chan
*Assistant Examiner*—Idriss N Alrobaye
(74) *Attorney, Agent, or Firm*—Park, Vaughan & Fleming LLP

(57) ABSTRACT

One embodiment of the present invention provides a processor which is configured to execute load-swapped instructions, which are possibly directed to unaligned source address. The processor is configured to execute the load-swapped instruction by loading a vector from a naturally-aligned memory region encompassing the source address, and in doing so rotating the bytes of the vector to cause the byte at the specified source address to reside at the least-significant byte position within the vector for a little-endian memory transaction, or causing said byte to be positioned at the most-significant byte position within the vector for a big-endian memory transaction. In a variation on this embodiment, the processor is also configured to execute a store-swapped instruction directed to a destination address by storing a vector into a naturally-aligned memory region encompassing the destination address, and in doing so rotating the bytes of the vector to cause the least significant byte of the vector to be stored to at the specified destination address on a little-endian processor, or causing the most significant byte of the vector to be stored to the destination address said on a big-endian processor, or causing the specified byte to be stored to the destination address in the case of an endian-specific store-swapped variant.

18 Claims, 5 Drawing Sheets

U.S. PATENT DOCUMENTS

| | | | |
|---|---|---|---|
| 2003/0056064 A1* | 3/2003 | Gschwind et al. | 711/154 |
| 2005/0257028 A1* | 11/2005 | Guffens et al. | 712/24 |
| 2007/0079305 A1* | 4/2007 | Duerinckx | 717/151 |
| 2007/0106881 A1* | 5/2007 | Thornton | 712/223 |
| 2007/0115150 A1* | 5/2007 | Kanno et al. | 341/50 |
| 2007/0124722 A1* | 5/2007 | Gschwind | 717/106 |
| 2007/0186077 A1* | 8/2007 | Gschwind et al. | 712/3 |
| 2007/0233766 A1* | 10/2007 | Gschwind | 708/490 |

* cited by examiner ately aligned memory region contain valid data elements for the vector which starts at the specified address.

INSTRUCTIONS FOR EFFICIENTLY ACCESSING UNALIGNED VECTORS

BACKGROUND

1. Field of the Invention

The present invention relates to techniques for improving computer system performance. More specifically, the present invention relates to instructions for efficiently accessing a vector located at an arbitrarily aligned memory address.

2. Related Art

In Single-Instruction-Multiple-Data (SIMD)-vector processors, accessing a vector in memory that is not naturally aligned (i.e., which resides at an address that is not an integer multiple of the vector length in bytes) is an inefficient multi-step process, which is complicated by the need to handle edge-cases without producing spurious virtual-memory faults. For example, see FIG. 1A, which illustrates both an aligned vector 102 and an unaligned vector 104.

Referring to FIG. 1B, conventional practice for manipulating unaligned vectors is to process the beginning 108 and ending portions 110 of the unaligned vectors separately, thereby allowing the large inner portion of the vectors to be processed as naturally aligned vectors 112, which is much faster. This is a complicated process and is not always possible to do in all systems and applications.

Many processors that support vector data types provide memory-access instructions that automatically handle misalignment by loading vector data from unaligned addresses into vector registers or storing data from vector registers to unaligned addresses. For example, FIG. 1B illustrates how an unaligned vector which spans two registers is aligned to fit into a single register. This approach places the burden of aligning data on the processor hardware, which must perform multiple aligned memory accesses and must assemble elements from each access into a coherent vector. Note that this hardware-based technique requires additional hardware and is consequently more expensive. Furthermore, this technique is inefficient for streaming because it discards good data during the streaming process.

Explicitly handling alignment in software (rather than in hardware) is even less efficient because it involves executing multiple load-store and bit-manipulation instructions for each vector of data that is processed.

It is also common for some types of code, such as mathematical kernels, to be implemented in several variants, each handling a different alignment case as efficiently as possible. This approach is time-consuming and error-prone, and also increases the debugging effort and lengthens the development process. Furthermore, the variants handling unaligned data are less efficient than the aligned variants. This difference in efficiency can cause performance variations that depend on the alignment of the data.

Hence, what is needed is a technique for efficiently accessing unaligned vectors without the above-described problems.

SUMMARY

One embodiment of the present invention provides a processor which is configured to execute load-swapped instructions. The processor includes an instruction fetch unit which is configured to fetch a load-swapped instruction to be executed, wherein the load-swapped instruction specifies a source address in memory, which is possibly an unaligned address. The processor also includes an execution unit which is configured to execute the load-swapped instruction by loading a vector from a naturally aligned memory region encompassing the source address into a register, and in doing so rotating bytes of the vector so that the byte at the source address is aligned to the most-significant position in the vector on a big-endian processor, or the least-significant position in the vector on a little-endian processor, or according to the designated endian-ness in the case of endian-specific instructions.

In a variation on this embodiment, the execution unit is configured to rotate bytes of the vector as the vector passes through a load-store path between a cache memory and the register.

One embodiment of the present invention provides a processor which is configured to executing a store-swapped instruction. The processor includes an instruction fetch unit which is configured to fetch a store-swapped instruction to be executed, wherein the store-swapped instruction specifies a destination address in memory, which is possibly an unaligned address. The processor also includes an execution unit which is configured to execute the store-swapped instruction by storing a vector from a register to a naturally aligned memory region encompassing the destination address and in doing so rotating bytes of the register so the most-significant byte of the vector is stored to the destination address on a big-endian processor, or the least-significant byte of the vector is stored to the destination address on a little-endian processor, or according to the designated endian-ness in the case of endian-specific instructions.

In a variation on this embodiment, the execution unit is configured to rotate bytes of the vector as the vector passes through a load-store path between the register and a cache memory.

In a variation on this embodiment, if the store-swapped instruction is a store-swapped-leading instruction, the execution unit is configured to: store a whole vector to the destination address if the destination address is naturally aligned; and to store a partial vector to the memory region from the destination address up to but not including the next naturally aligned address boundary if the destination address is unaligned.

In a variation on this embodiment, if the store-swapped instruction is a store-swapped-trailing instruction, the execution unit is configured to: store nothing to the destination address if the destination address is naturally aligned; and to store a partial vector to the memory region from the nearest naturally aligned address boundary less than the destination address, up to but not including the destination address. The store swapped trailing instruction may optionally perform no store if the destination address is naturally aligned.

One embodiment of the present invention provides a processor which is configured to execute load-swapped-control-vector instructions. The processor includes an instruction fetch unit configured to fetch a load-swapped-control-vector instruction to be executed, wherein the load-swapped-control-vector instruction specifies an address in memory, which is possibly an unaligned address. The processor also includes an execution unit which is configured to execute the load-swapped-control-vector instruction by using the address to construct a control vector containing predicate elements. More specifically, executing a load-swapped-control-vector instruction involves using a specified address of arbitrary alignment to construct a control vector containing predicate elements indicating which bytes contained within the naturally aligned vector-sized memory region encompassing the specified address reside at addresses below the specified address.

Table 1 provides exemplary code for a vector-move operation in accordance with an embodiment of the present invention.

Table 2 provides exemplary code for a vector-move operation in which an aligned vector is never constructed in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Computer System

Figure 1A:
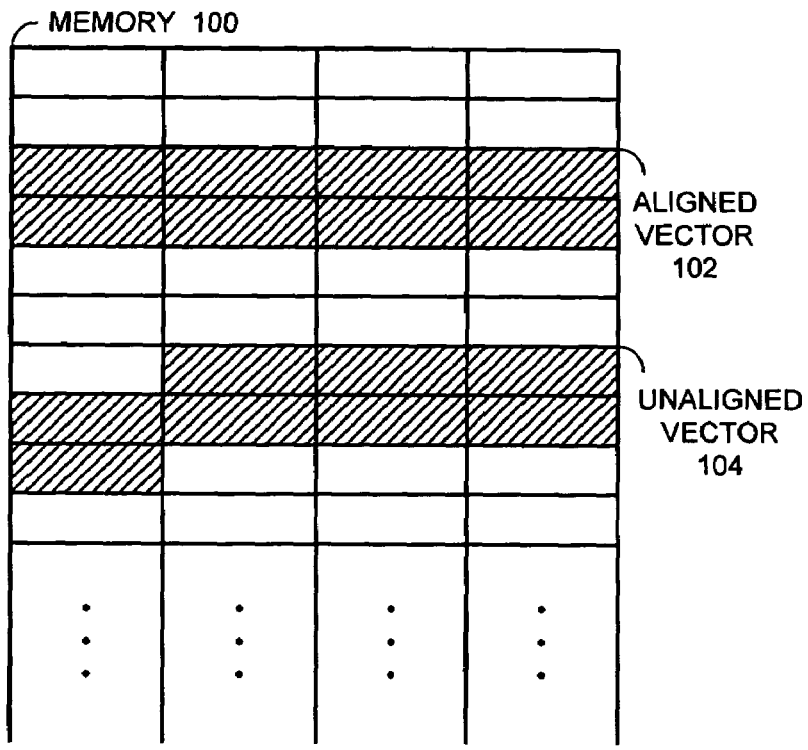
FIG. 1A illustrates an aligned vector and an unaligned vector.
Figure 1B:
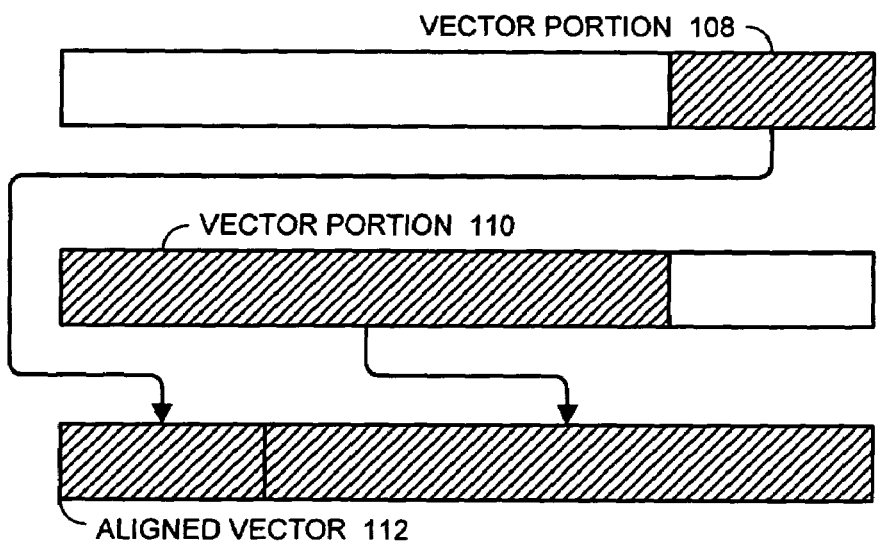
FIG. 1B illustrates the process of aligning a vector.
Figure 2A:
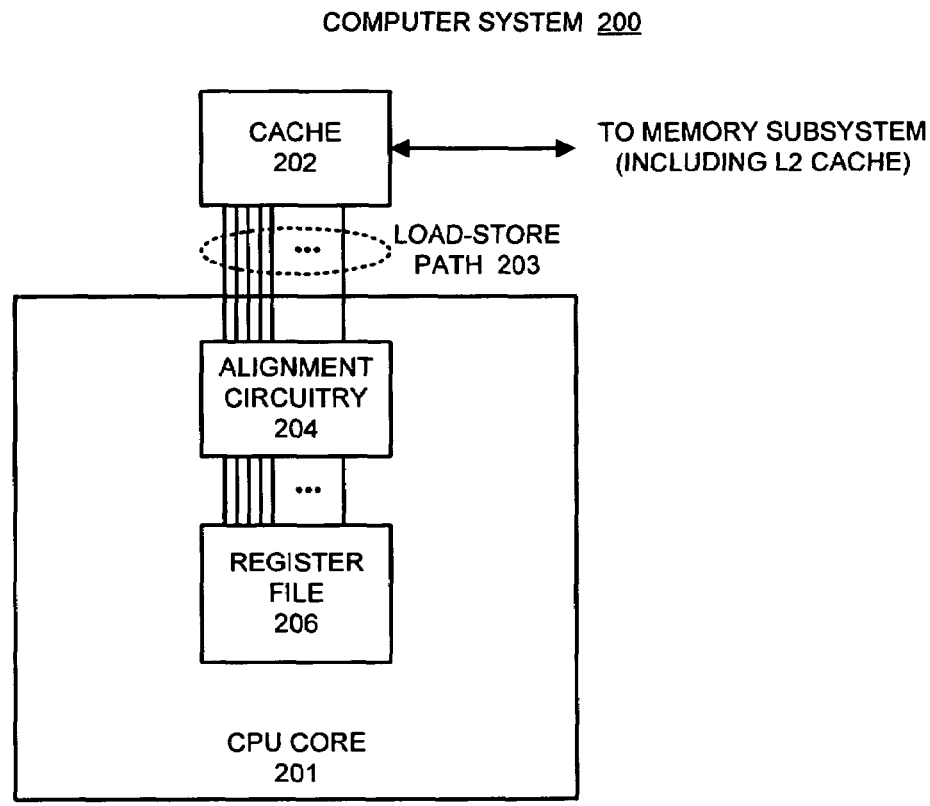
FIG. 2A illustrates a computer system in accordance with an embodiment of the present invention.

FIG. 2A illustrates a computer system 200 in accordance with an embodiment of the present invention. Computer system 200 can generally include any type of computer system, including, but not limited to, a computer system based on a microprocessor, a mainframe computer, a digital signal processor, a portable computing device, a personal organizer, a device controller, a cell phone or a computational engine within an appliance.

Computer system 200 includes a central-processing unit (CPU) core 201 which performs computational operations. While performing these computational operations, CPU core 201 operates on data items retrieved from cache memory 202, which is coupled to a memory subsystem (not illustrated). In one embodiment of the present invention, cache memory 202 is a Level-One (L1) data cache which communicates with a memory subsystem that includes a Level-Two (L2) unified instruction/data cache and a main memory.

CPU core 201 includes a register file 206 which holds operands which are processed by functional units within CPU core 201.

CPU core 201 additionally includes alignment circuitry 204 which is located along a load-store path 203 between cache memory 202 and register file 206. This alignment circuitry 204 performs "byte-swapping operations" to facilitate performing "load-swapped" instructions and "store-swapped" instructions, which are described in more detail below.

Figure 2B:
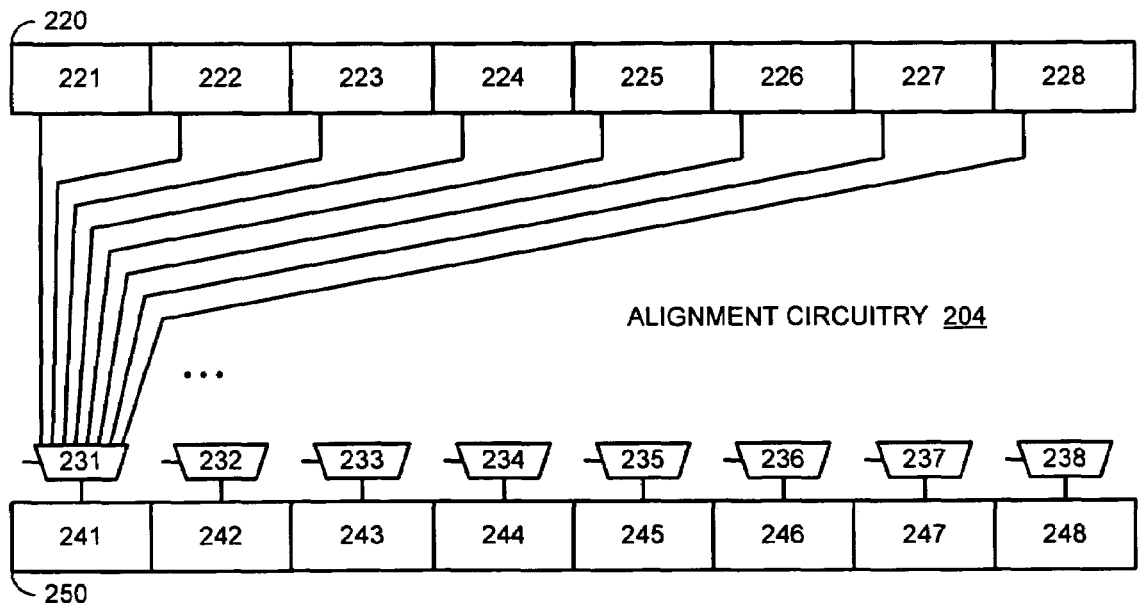
FIG. 2B illustrates byte-swapping circuitry in accordance with an embodiment of the present invention.

In one embodiment of the present invention, alignment circuitry 204 is comprised a number of multiplexers 231-238 as is illustrated in FIG. 2B. During operation, the alignment circuitry 204 illustrated in FIG. 2B receives a number of bytes 221-228 on load-store path 203 and then swaps the bytes using multiplexers 231-238 to form a swapped set 250 of bytes 241-248. This swapping process is described in more detail below.

The Load-Swapped-Control-Vector Instruction

Figure 3:
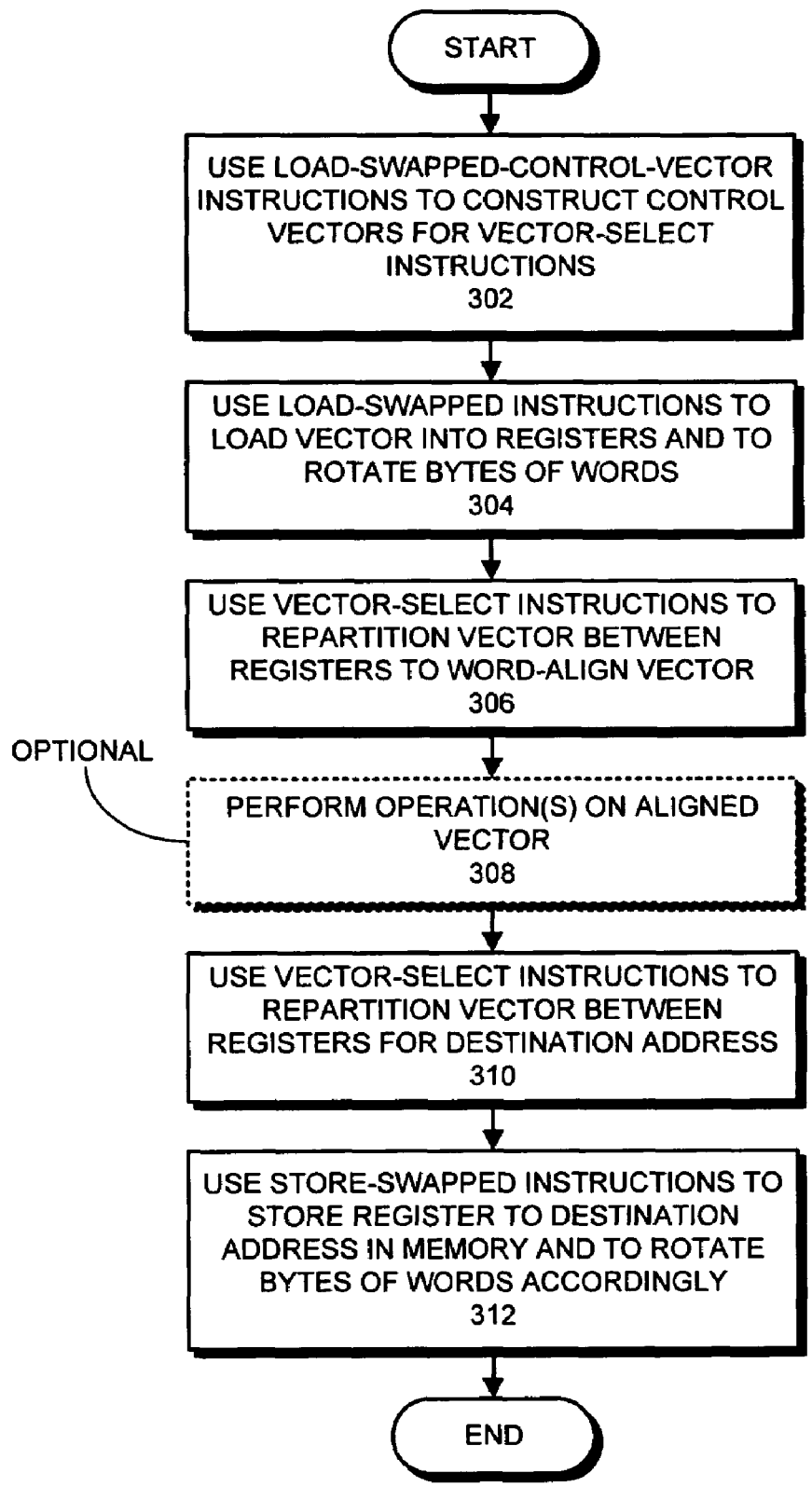
FIG. 3 presents a flow chart illustrating the process of moving an unaligned vector in accordance with an embodiment of the present invention.

FIG. 3 presents a flow chart illustrating the process of moving an unaligned vector in accordance with an embodiment of the present invention. During this process, the system first uses a load-swapped-control-vector instruction to construct a control vector containing predicate elements to control the vector-select instructions (step 302).

Upon receiving the load-swapped-control-vector instruction along with a target address of arbitrary alignment, the processor takes the target address and computes a control vector of predicate elements (true/false) based on the target address, and then stores this control vector in a register. The instruction evaluates the target address with respect to the naturally aligned address less than or equal to the target address. Note that the difference between the target address and the naturally aligned address (N) is used to set predicate elements. On a little-endian processor, predicate elements corresponding to the N least significant bytes of the control vector are set to a given polarity, and predicate elements corresponding to the remaining bytes of the control vector are set to the opposite polarity. On a big-endian processor, predicate elements corresponding to the N most significant bytes of the control vector are set to a given polarity, and predicate elements corresponding to the remaining bytes of the control vector are set to the opposite polarity. This control vector may be used by subsequent "vector-select" instructions or logical operations to merge individual bytes from multiple vectors into a single result vector.

The Load-Swapped Instruction

The load-swapped instruction is used to load a vector into registers (step 304). Upon receiving a load-swapped instruction, the processor loads a vector encompassing the source address from a naturally-aligned memory address into a register and in doing so rotates bytes of the vector, so that the byte at the source address resides in the least significant byte position of the register on a little-endian processor, or in the most-significant byte position in the vector for a big-endian processor. More specifically, the load-swapped instruction takes a source address of arbitrary alignment and loads a vector-sized datum from the nearest naturally aligned address that is less-than-or-equal-to the address provided, i.e., naturally_aligned_address=(source_address−N); where N=(source_address mod vector_length_in_bytes)

During the Load-Swapped operation, the processor hardware rotates bytes through the vector to effect a possible transformation: on a little-endian processor, bytes are rotated to the right N positions, while on a big-endian processor, bytes are rotated left N positions. Equivalently, bytes may be rotated in the opposite direction by (vector_length_in_bytes−N) positions. These transformations are functionally equivalent to swapping data such that the bytes residing at addresses lower than the source address are swapped, as a set, with the set of bytes residing at addresses greater than or equal to the source address.

The system may optionally employ vector-select instructions to repartition the vector between the registers to create a vector containing the data from the possibly unaligned address above, wherein each vector-select instruction selects between bytes of input registers containing the vector (step 306) using a control vector.

The system may then optionally perform one or more operations on the vector (step 308). (Note that the dashed lines in FIG. 3 indicate that step 308 is optional.)

The system may then optionally employ vector-select instructions to repartition the vector between the registers in a manner which is consistent with using a later store-swapped instruction to store the vector to a memory address or arbitrary alignment, wherein each vector-select instruction selects between bytes of input registers containing the vector (step 310).

The Store-Swapped Instruction

The store-swapped instruction is used to store a vector register containing the vector to the destination address, wherein each store-swapped instruction stores a whole vector from a register into memory and in doing so rotates bytes of the vector, so that the least significant byte of the vector is stored to the destination address on a little-endian processor, or so that the most-significant byte of the vector is stored to the destination address on in a big-endian processor (step 312).

More specifically, upon receiving a store-swapped instruction, the processor takes a vector register, and a target address of arbitrary alignment, and stores the vector from the register into the nearest naturally-aligned memory address less than or equal to the target address, i.e.

naturally_aligned_address=(destination_address−N);
where N=(destination_address mod vector_length_in_bytes)

During the store-swapped operation, the processor hardware rotates bytes through the vector to effect a possible transformation: on a little-endian processor, bytes are rotated to the left N positions, while on a big-endian processor, bytes are rotated right N positions. Equivalently, bytes may be rotated in the opposite direction by (vector_length_in_bytes−N) positions. These transformations are functionally equivalent to swapping data such that the bytes residing at addresses lower than the source address are swapped, as a set, with the set of bytes residing at addresses greater than or equal to the source address.

If the destination address is unaligned, a "store-swapped-leading instruction" and a "store-swapped-trailing instruction" can be used to store partial vectors at the beginning and the end of a range of consecutive vectors.

Upon receiving a store-swapped-leading instruction, the processor stores a partial vector, swapped in the manner described above, to the target address. The amount of data stored is dependent upon the target address. Data is stored into the memory ranging from the target address until one-byte before the next naturally aligned address boundary, inclusive (N-bytes). On a little-endian processor, the N least-significant bytes of the vector are stored. On a big-endian processor, the N most-significant bytes of the vector are stored to the target address.

Similarly, upon receiving a store-swapped-trailing instruction, the processor stores a partial vector swapped in the manner described above, to the nearest naturally aligned address less than or equal to the target address. The amount of data stored is dependent upon the target address. Data is stored into the memory ranging from the nearest naturally-aligned address which is less than or equal to the target address until one-byte before the target address, inclusive (N-bytes). On a little-endian processor, the N most-significant bytes of the vector are stored. On a big-endian processor, the N least-significant bytes of the vector are stored to the nearest naturally aligned address less than or equal to the target address. The processor may optionally store no data if the target address is naturally aligned.

Note that the above-described embodiment of the present invention can leverage existing hardware found in most processors for reading-from and writing-to the data cache(s). Such circuits exist to load data types shorter than the length of a cache-line, which is the typical case for all data types of a given processor. Moreover, since the load-swapped and store-swapped instructions only read/write data corresponding to a single naturally aligned address, there is no need to correlate multiple memory-read accesses in hardware.

TABLE 1

R = Load_Swapped_Control_Vector(source_ptr);
W = Load_Swapped_Control_Vector(dest_ptr);
A = Load_Swapped(source_ptr++);
B = Load_Swapped(source_ptr++);
C = Load_Swapped(source_ptr++) ;
if (unaligned)
    D = LoadSwapped(source_ptr++)
  J = Vector_Select(R,A,B); // compose vectors from swapped data
    K = Vector_Select(R,B,C);
    L = Vector_Select(R,C,D);
// J, K, and L are 3 consecutive vectors of data from an unaligned
source address
M = Vector_Select(W,K,J); // decompose into swapped vectors
N = Vector_Select(W,L,K);
Store_Swapped_Leading(J,dest_ptr++);
Store_Swapped(M,dest_ptr++);
Store_Swapped(N,dest_ptr++);
if (unaligned)
    Store_Swapped_Trailing(L,dest_ptr);

EXAMPLE

Figure 4:
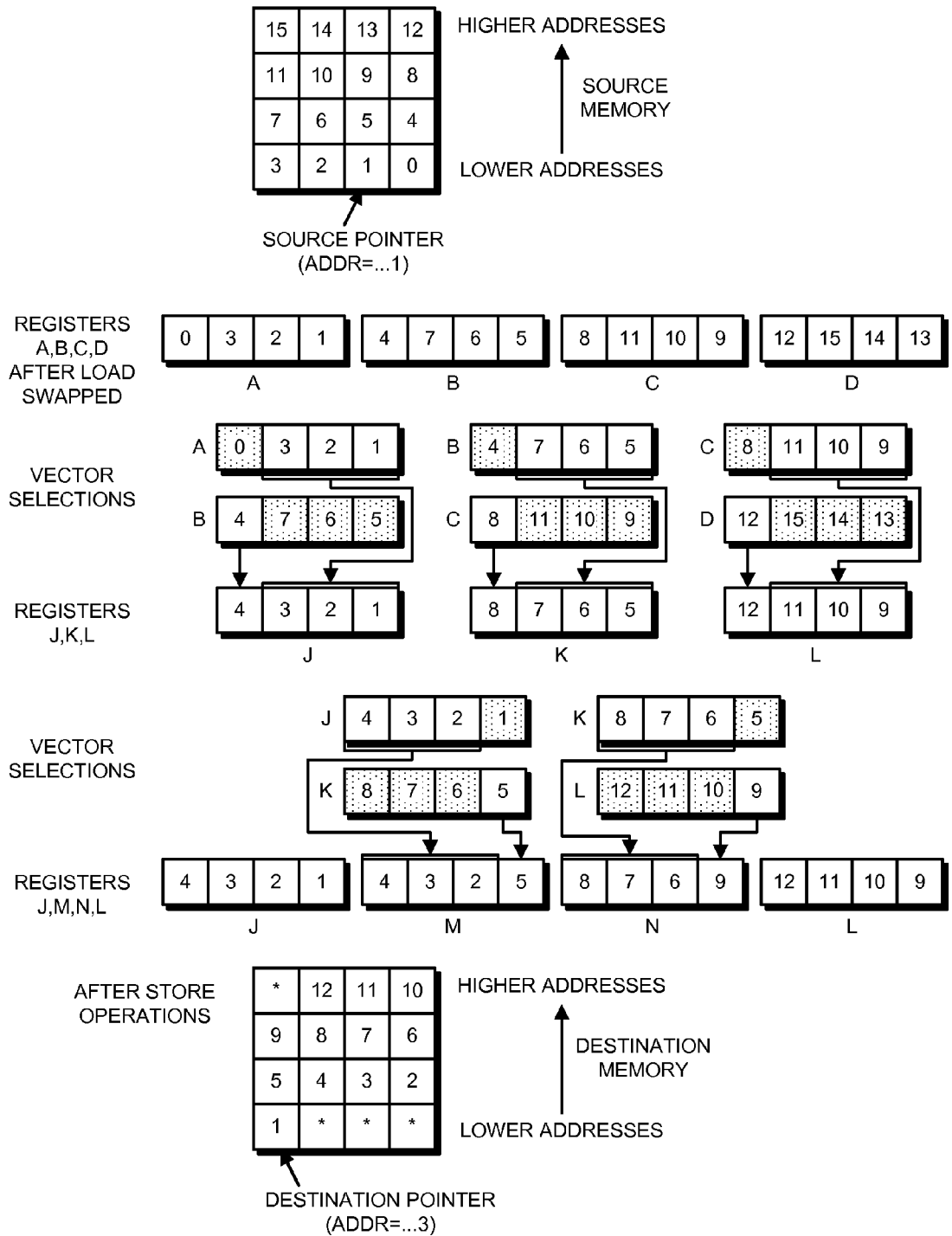
FIG. 4 illustrates an exemplary vector-move operation in accordance with an embodiment of the present invention.

Table 1 illustrates how alignment-agnostic vector code can be written to perform a vector-move operation in accordance with an embodiment of the present invention. This example performs a vector-move operation for arbitrarily-aligned source and destination pointers on a little-endian processor. Note that in this example, there are two vector-select operations per move. (FIG. 4 graphically illustrates the how the move operation is accomplished.)

Example Which Does Not Construct an Aligned Vector

Figure 5:
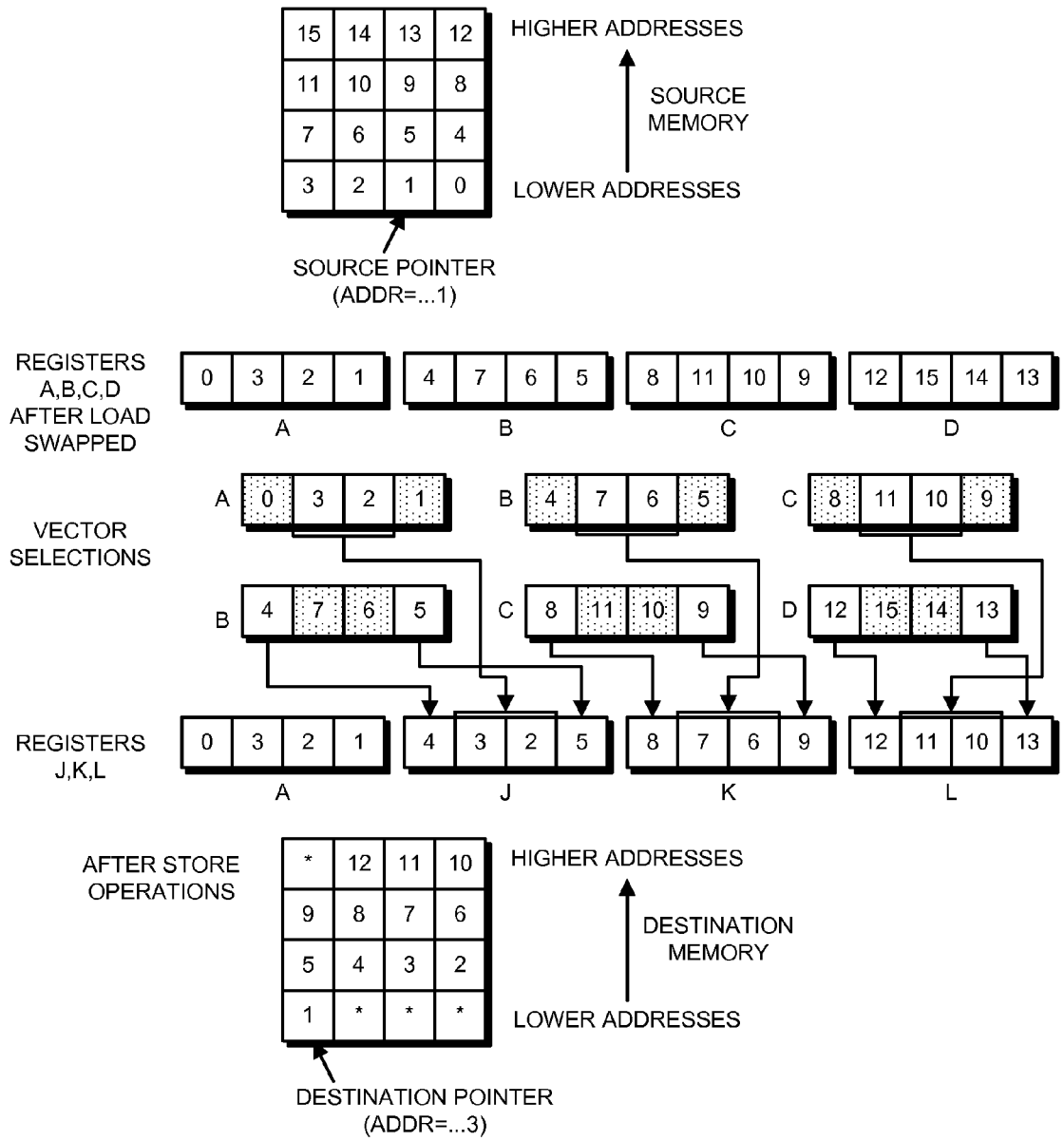
FIG. 5 illustrates an exemplary vector-move operation in which an aligned vector is never constructed in accordance with an embodiment of the present invention.

Table 2 illustrates how alignment-agnostic vector code can be written to perform a vector-move operation in which an aligned vector is never constructed in accordance with an embodiment of the present invention. This example similarly performs a data move operation for arbitrarily-aligned source and destination pointers on a little-endian processor. However, in this example, only a single vector-select operation is performed at the cost of never forming a proper vector in the processor registers. Because a proper vector is never formed in the registers, the system can only perform at limited set of operations on the vector during the moving process. More specifically, the system can only perform operations on the vector which do not require interactions between different byte positions in the vector (FIG. 5 graphically illustrates the how this move operation is accomplished.)

TABLE 2

```
R = Load_Swapped_Control_Vector(source_ptr);
W = Load_Swapped_Control_Vector(dest_ptr);
X = R ^ W;
A = Load_Swapped(source_ptr++);
B = Load_Swapped(source_ptr++);
C = Load_Swapped(source_ptr++);
D = Load_Swapped(source_ptr++);
J = Vector_Select(X,B,A);
K = Vector_Select(X,C,B);
L = Vector_Select(X,D,C);
Store_Swapped_Leading(A,dest_ptr++);
StoreSwapped(J,dest_ptr++);
StoreSwapped(K,dest_ptr++);
Store_Swapped_Trailing(L,dest_ptr);
```

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a load-swapped instruction, comprising:
receiving the load-swapped instruction to be executed, wherein the load-swapped instruction specifies a source address in memory, which is arbitrarily aligned; and
executing the load-swapped instruction, which involves loading a vector from a naturally-aligned memory region encompassing the source address into a register, and in doing so, if the source address is unaligned, rotating the bytes of the vector by swapping a set of bytes residing at addresses lower than the source address with a set of bytes residing at addresses greater than or equal to the source address;
wherein rotating the bytes of the vector involves rotating the bytes N positions, where N is equivalent to either the source address specified by the instruction modulo the vector length in bytes or the source address specified by the instruction modulo the vector length in bytes subtracted from the vector length in bytes;
wherein rotating the bytes of the vector occurs before the vector reaches the register; and
wherein rotating the bytes of the vector involves using an alignment circuit which is located along a load-store path between the memory and the register to cause the byte at the specified source address to reside at the least-significant byte position within the vector for a little-endian memory transaction, or causing said byte to be positioned at the most-significant byte position within the vector for a big-endian memory transaction.

2. The method of claim 1, wherein in response to N being equivalent to the source address specified by the instruction modulo the vector length in bytes, the load-swapped instruction rotates bytes in the direction determined by the endian-ness of the memory transaction, wherein the vector is rotated to the left N byte positions for a big-endian memory transaction, or the vector is rotated to the right N byte positions in the case of little-endian memory transactions.

3. The method claim 1, wherein in response to N being equivalent to the source address specified by the instruction modulo the vector length in bytes subtracted from the vector length in bytes, the load-swapped instruction rotates bytes in the direction determined by the endian-ness of the memory transaction, and wherein the vector is rotated to the right N byte positions for a big-endian memory transaction, or the vector is rotated to the left N byte positions in the case of little-endian memory transactions.

4. A method for executing a store-swapped instruction, comprising:
receiving the store-swapped instruction to be executed, wherein the store-swapped instruction specifies a destination address in memory, which is arbitrarily aligned; and
executing the store-swapped instruction, which involves storing a vector from a register into a naturally-aligned memory region encompassing the destination address, and in doing so, if the destination address is unaligned, rotating the bytes of the vector by swapping a set of bytes residing at addresses lower than the destination address with a set of bytes residing at addresses greater than or equal to the destination address;
wherein rotating the bytes of the vector involves rotating the bytes N positions, where N is equivalent to either the destination address specified by the instruction modulo the vector length in bytes or the destination address specified by the instruction modulo the vector length in bytes subtracted from the vector length in bytes;
wherein rotating the bytes of the vector occurs after the vector moves out of the register and before the vector is stored in the memory; and
wherein rotating the bytes of the vector involves using an alignment circuit which is located along a load-store path between the memory and the register to cause the least significant byte of the vector to be stored to at the specified destination address on a little-endian processor, or causing the most significant byte of the vector to be stored to the destination address said on a big-endian processor, or causing the specified byte to be stored to the destination address in the case of an endian-specific store-swapped variant.

5. The method of claim 4, wherein in response to N being equivalent to the destination address specified by the instruction modulo the vector length in bytes, the store-swapped instruction rotates bytes in the direction determined by the endian-ness of the memory transaction, wherein the vector is rotated to the right N byte positions for a big-endian memory transaction, or the vector is rotated to the left N byte positions in the case of little-endian memory transactions.

6. The method of claim 4, wherein in response to N being equivalent to the destination address specified by the instruction modulo the vector length in bytes subtracted from the vector length in bytes, the store-swapped instruction rotates bytes in the direction determined by the endian-ness of the memory transaction, and wherein the vector is rotated to the left N byte positions for a big-endian memory transaction, or the vector is rotated to the right N byte positions in the case of little-endian memory transactions.

7. The method of claim 4, where if the store-swapped instruction is a store-swapped-leading instruction, storing the vector to the destination address involves:
storing a whole vector to the destination address if the destination address is naturally aligned; and storing a partial vector to the destination address if the destination address is unaligned.

8. The method of claim 6, where if the store-swapped instruction is a store-swapped-trailing instruction, storing the vector to the destination address involves:
storing nothing to the destination address if the destination address is aligned with memory; or
storing a partial vector to the modified destination address if the destination address is unaligned.

9. A method for executing a load-swapped-control-vector instruction, comprising:
receiving a load-swapped-control-vector instruction to be executed, wherein the load-swapped-control-vector instruction specifies a target address in memory, which is arbitrarily aligned; and
executing the load-swapped-control-vector instruction to construct a control vector comprising predicate elements, wherein executing the load-swapped-control-vector instruction involves determining a value N, wherein N is the specified target address modulo the vector length in bytes, wherein the predicate elements comprise a true polarity and a false polarity, and wherein the control vector is constructed based on N and an endian-ness of a memory transaction;
wherein for a big-endian memory transaction the N most-significant elements in the control vector are set to the true polarity and the remaining elements of the vector are set to the false polarity;
wherein for a little-endian memory transaction the N least-significant elements in the control vector are set to the true polarity and the remaining elements of the vector are set to the false polarity; and
wherein the control vector is used by a vector select instruction to determine which individual bytes from multiple vectors are selected to merge into a single output vector.

10. A computer system configured to execute a load-swapped instruction, comprising:
a processor;
a memory;
an instruction fetch unit within the processor configured to fetch the load-swapped instruction to be executed, wherein the load-swapped instruction specifies a source address in memory, which is arbitrarily aligned; and
an execution unit within the processor configured to execute the load-swapped instruction by loading a vector from a naturally-aligned memory region encompassing the source address into a register, and in doing so, if the source address is unaligned, rotating the bytes of the vector by swapping a set of bytes residing at addresses rower than the source address with a set of bytes residing at addresses greater than or equal to the source address;
wherein rotating the bytes of the vector involves rotating the bytes N positions, where N is equivalent to either the source address specified by the instruction modulo the vector length in bytes or the source address specified by the instruction modulo the vector length in bytes subtracted from the vector length in bytes;
wherein rotating the bytes of the vector occurs before the vector reaches the register; and
wherein rotating the bytes of the vector involves using an alignment circuit which is located along a load-store path between the memory and the register to cause the byte at the specified source address to reside at the least-significant byte position within the vector for a little-endian memory transaction, or causing said byte to be positioned at the most-significant byte position within the vector for a big-endian memory transaction.

11. The computer system of claim 10, wherein in response to N being equivalent to the source address specified by the instruction modulo the vector length in bytes, the load-swapped instruction rotates bytes in the direction determined by the endian-ness of the memory transaction, wherein the vector is rotated to the left N byte positions for a big-endian memory transaction, or the vector is rotated to the right N byte positions in the case of little-endian memory transactions.

12. The computer system of claim 10, wherein in response to N being equivalent to the destination address specified by the instruction modulo the vector length in bytes subtracted from the vector length in bytes, the load-swapped instruction rotates bytes in the direction determined by the endian-ness of the memory transaction, and wherein the vector is rotated to the right N byte positions for a big-endian memory transaction, or the vector is rotated to the left N byte positions in the case of little-endian memory transactions.

13. A computer system configured to execute a store-swapped instruction, comprising:
a processor;
a memory;
an instruction fetch unit within the processor configured to fetch the store-swapped instruction to be executed, wherein the store-swapped instruction specifies a destination address in memory, which is arbitrarily aligned; and
an execution unit within the processor configured to execute the store-swapped instruction by storing a vector from a register into a naturally-aligned memory region encompassing the destination address, and in doing so, if the source address is unaligned, rotating the bytes of the vector by swapping a set of bytes residing at addresses lower than the destination address with a set of bytes residing at addresses greater than or equal to the destination address;
wherein rotating the bytes of the vector involves rotating the bytes N positions, where N is equivalent to either the source address specified by the the instruction modulo the vector length in bytes or the source address specified by the instruction modulo the vector length in bytes subtracted from the vector length in bytes;
wherein rotating the bytes of the vector occurs after the vector moves out of the register and before the vector is stored in the memory; and
wherein rotating the bytes of the vector involves using an alignment circuit which is located along a load-store path between the memory and the register to cause the least significant byte of the vector to be stored to at the specified destination address on a little-endian processor, or causing the most significant byte of the vector to be stored to the destination address said on a big-endian processor, or causing the specified byte to be stored to the destination address in the case of an endian-specific store-swapped variant.

14. The computer system of claim 13, wherein in response to N being equivalent to the destination address specified by the instruction modulo the vector length in bytes, the store-swapped instruction rotates bytes in the direction determined by the endian-ness of the memory transaction, wherein the vector is rotated to the right N byte positions for a big-endian memory transaction, or the vector is rotated to the left N byte positions in the case of little-endian memory transactions.

15. The computer system of claim 13, wherein in response to N being equivalent to the destination address specified by the instruction modulo the vector length in bytes subtracted from the vector length in bytes, the store-swapped instruction rotates bytes in the direction determined by the endian-ness of the memory transaction, and wherein the vector is rotated to the left N byte positions for a big-endian memory transaction, or the vector is rotated to the right N byte positions in the case of little-endian memory transactions.

16. The computer system of claim 13, wherein if the store-swapped instruction is a store-swapped-leading instruction, storing the vector to the destination address involves:
   storing a whole vector to the destination address if the destination address is naturally aligned; and
   storing a partial vector to the destination address if the destination address is unaligned.

17. The computer system of claim 13, wherein if the store-swapped instruction is a store-swapped-trailing instruction, storing the vector to the destination address involves:
   storing nothing to the destination address if the destination address is aligned with memory; or
   storing a partial vector to the modified destination address if the destination address is unaligned.

18. A computer system configured to execute a load-swapped-control-vector instruction, comprising:
   a processor;
   a memory;
   an instruction fetch unit within the processor configured to fetch the load-swapped-control-vector instruction to be executed, wherein the load-swapped-control-vector instruction specifies a target address in memory, which is arbitrarily aligned; and
   an execution unit within the processor configured to execute the load-swapped-control-vector instruction to construct a control vector comprising predicate elements, wherein executing the load-swapped-control-vector instruction, involves determining a value N, wherein N is the specified target address modulo the vector length in bytes, wherein the predicate elements comprise a true polarity and a false polarity, and wherein the control vector is constructed based on N and an endian-ness of a memory transaction;
   wherein for a big-endian memory transaction the N most-significant elements in the control vector are set to the true polarity and the remaining elements of the vector are set to the false polarity;
   wherein for a little-endian memory transaction the N least-significant elements in the control vector are set to the true polarity and the remaining elements of the vector are set to the false polarity; and
   wherein the control vector is used by a vector select instruction to determine which individual bytes from multiple vectors are selected to merge into a single output vector.

* * * * *

UNITED STATES PATENT AND TRADEMARK OFFICE
CERTIFICATE OF CORRECTION

PATENT NO. : 7,620,797 B2
APPLICATION NO. : 11/591804
DATED : November 17, 2009
INVENTOR(S) : Jeffry E. Gonion et al.

It is certified that error appears in the above-identified patent and that said Letters Patent is hereby corrected as shown below:

In claim 10 (at column 9, line 52), please replace the word "rower" with the word --lower--.

Signed and Sealed this

Fifth Day of January, 2010

David J. Kappos
*Director of the United States Patent and Trademark Office*